US005755029A

United States Patent [19]

Learned

[11] Patent Number: 5,755,029

[45] Date of Patent: May 26, 1998

[54] DOUBLE OVERHEAD CAMSHAFT ALIGNMENT METHOD

[76] Inventor: Kerry D. Learned, 4003 Seneca Dr., Mt. Vernon, Wash. 98273

[21] Appl. No.: 788,683

[22] Filed: Jan. 24, 1997

Related U.S. Application Data

[62] Division of Ser. No. 337,895, Nov. 14, 1994, abandoned.

[51] Int. Cl.[6] .................. B23P 6/00

[52] U.S. Cl. .................. 29/888.011; 29/402.03; 29/402.08; 29/426.1; 29/464; 29/559

[58] Field of Search .................. 29/402.03, 402.08, 29/426.1, 464, 559, 407.09, 407.1, 888.011, 281.1, 281.6, 283

[56] References Cited

U.S. PATENT DOCUMENTS

| | | | |
|---|---|---|---|
| 2,404,456 | 7/1946 | Pierce | 29/464 |
| 2,621,807 | 12/1952 | Rendich | 269/900 |
| 3,463,478 | 8/1969 | Hennessey | 269/900 |
| 3,900,732 | 8/1975 | Costales | 29/271 |
| 4,092,770 | 6/1978 | Polashak | 29/283 |
| 4,330,925 | 5/1982 | Kato et al. | 29/464 |
| 4,373,240 | 2/1983 | Castoe | 29/281.6 X |
| 4,499,644 | 2/1985 | Goldsby | 29/281.6 |
| 4,989,846 | 2/1991 | Quinn | 269/900 |
| 5,064,321 | 11/1991 | Barnes | 269/900 |
| 5,181,304 | 1/1993 | Piotrowski | 29/271 |
| 5,454,153 | 10/1995 | Noel | 29/281.1 |

*Primary Examiner*—Joseph M. Gorski
*Attorney, Agent, or Firm*—Richardson & Folise

[57] ABSTRACT

A camshaft alignment tool and method uses a main body having at least three projections to engage cogs on cog wheel driven double overhead camshafts. The tool is used to maintain the cog wheels in a fixed relationship with respect to one another during replacement of a cooperatively toothed timing belt. Use of the tool enables a single technician to change the timing belt on a high performance internal combustion engine employing double overhead camshafts even if the cam surfaces are aggressive and the valve return springs employ large spring constants.

2 Claims, 3 Drawing Sheets

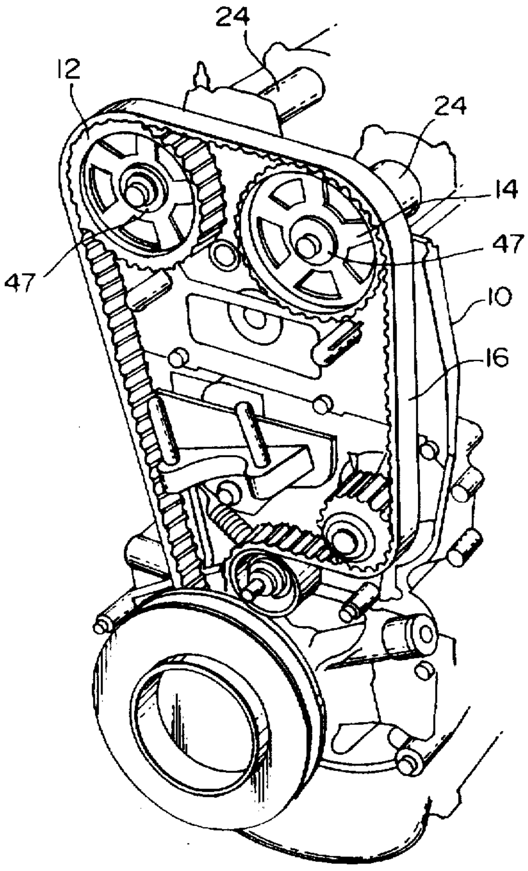
FIG. 1
FIG. 2
PRIOR ART
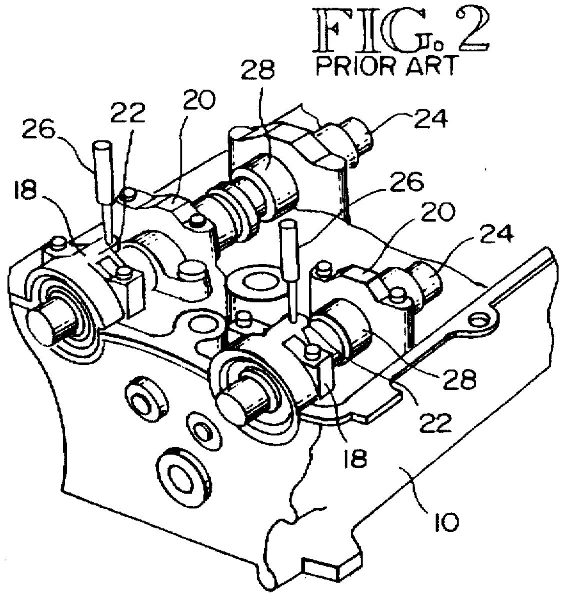
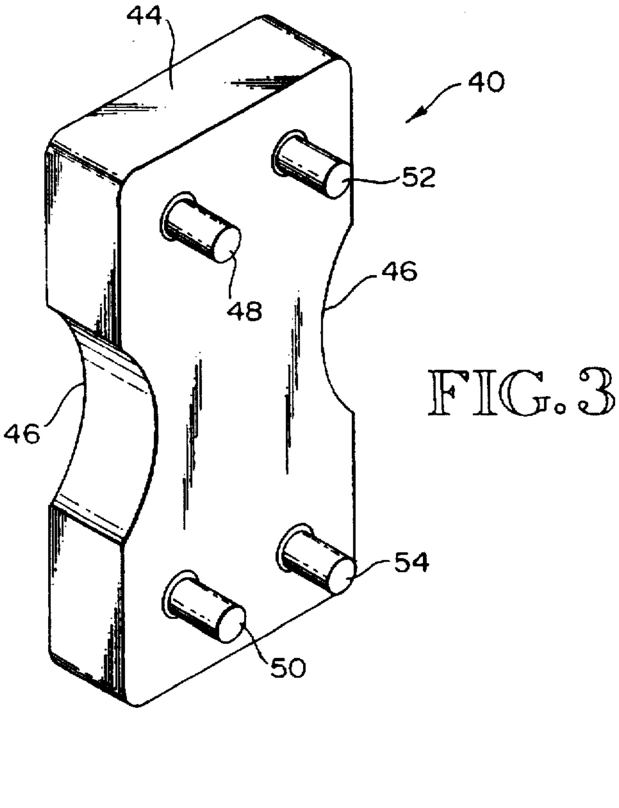
FIG. 3

FIG. 5
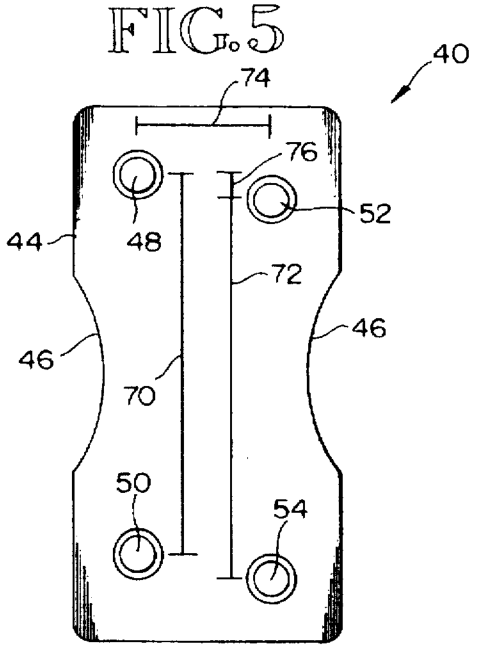
FIG. 6
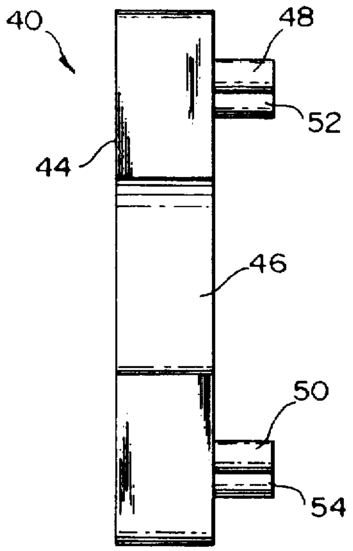
FIG. 7
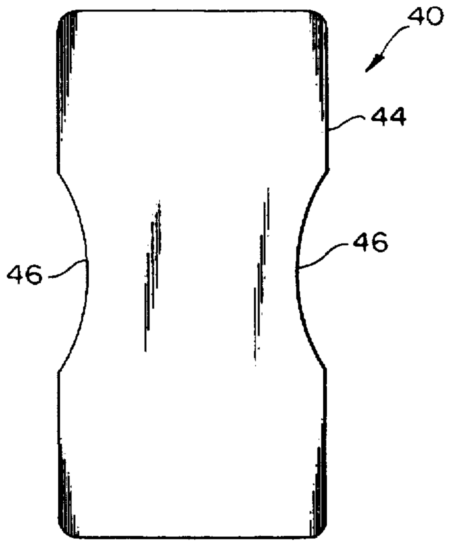
FIG. 8
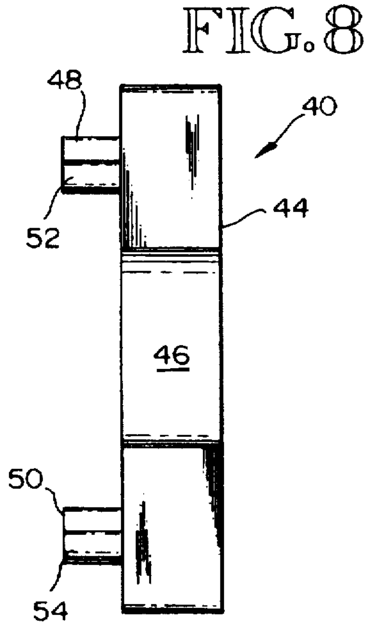
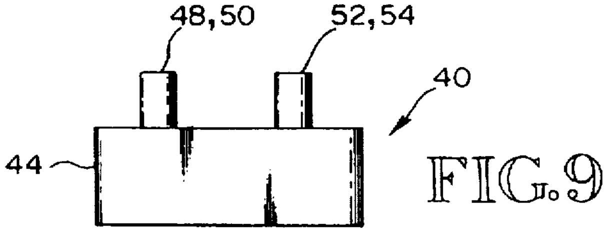
FIG. 9

DOUBLE OVERHEAD CAMSHAFT ALIGNMENT METHOD

RELATED APPLICATIONS

This application is a divisional of U.S. application Ser. No. 08/337,895 filed on Nov. 14, 1994 and now abandoned.

TECHNICAL FIELD

The invention relates to tools and techniques for repairing internal combustion engines. More specifically, the invention relates to a method and apparatus for maintaining the timing position of double overhead camshafts during replacement or reinstallation of a toothed, timing belt.

BACKGROUND OF THE INVENTION

Overhead camshaft internal combustion engines have almost entirely replaced older style, overhead valve engines employing rocker arms, and connecting rods actuated by a camshaft adjacent to the crankcase of the internal combustion engine. In such prior technology engines, the camshaft was typically rotationally coupled to the crankshaft by intermeshed sprockets. Therefore, the timing of the camshaft with respect to the crankshaft was relatively fixed and capable of only minor adjustment by relative rotation and reattachment of the camshaft with its crankshaft engaging sprocket.

Overhead camshafts have eclipsed the old style push rods engine primarily due to the increased performance of the overhead camshaft engine, and manufacturing economy. In this modern type of engine, the engine crankshaft is journaled to a cogged, crankshaft pulley which engages a cooperatively toothed belt. The toothed belt also engages a cog wheel on each camshaft which drives the same. Periodically, the toothed belt must be replaced so that timing between the camshaft and the crankshaft are not lost during engine operation due to belt breakage. In addition, the toothed belt is often removed and reinstalled during repair or replacement of water pumps, seals, and the like.

In a single overhead camshaft engine, such replacement is relatively straightforward. There is generally provided a timing mark on the engine itself which is aligned with a corresponding timing mark on the camshaft cog wheel. A similar set of marks are typically provided for the crankshaft cog wheel as well. Rotating the crankshaft cog wheel to the correct timing position is relatively easy as the forces tending to rotate the crankshaft to any given position are relatively minor. However, depending on the strength of the valve springs which bias the overhead valves to a closed position, and the aggressiveness of the cam surfaces, the camshaft cog wheel is biased to a plurality of rest positions which typically do not cooperatively align the camshaft cog wheel timing mark with its attendant mark on the engine housing at top dead center, number one cylinder. Nevertheless, an automobile technician can relatively easily hold the camshaft cog wheel in place with one hand, while using the free hand to place the belt on the camshaft cog wheel, and the crankshaft cog wheel.

The repair procedure described above becomes somewhat more difficult in a double overhead camshaft engine. For example, in the conventional in-line, four cylinder double overhead camshaft engine 10 shown in FIG. 1, two adjacent camshaft cog wheels 12, 14 must be maintained in the appropriate timing position, top dead center cylinder number one position while the timing belt 16 is replaced. In an engine employing a single exhaust and intake valve per cylinder, a technician can generally, if somewhat difficultly maintain both camshaft cog wheels in their appropriately timed position with the fingers of one hand, while the other hand replaces the belt. However, the difficulty of this task increases dramatically in an engine employing four valves (i.e., two intake and two exhaust) per cylinder, with aggressive cam surfaces and valve return springs having large spring constants as is typical of today's, high performance four cylinder engines. In fact, it is virtually impossible for a technician of ordinary strength to hold both camshaft cog wheels 12, 14 in place with one hand, while the free hand is used to replace the timing belt 16. Thus, two technicians are often necessary to effect such a timing belt replacement.

At least one automobile manufacturer has addressed this problem by modifying the forward camshaft bearing saddle 18 as shown in FIG. 2 of the internal combustion engine 10. In contrast to the more rearwardly displaced camshaft bearing saddles 20, the forward saddles are provided with projections 22 having bores therethrough which cooperate with radial bores (not shown) in the camshafts 24. Individual, pin-like alignment tools 26 can be inserted through the bores in their projections 22 and the camshafts 24 to hold the cog wheels 12, 14 in their respective, timed positions. Unfortunately, due to the very large spring constants of the overhead valve springs, the aggressive surfaces of the cams 28, and the loose tolerances of the tools 26 with respect to the bores, it is possible for a technician to misalign the cog wheels 12, 14 with respect to one another by at least a single tooth, or cog, during the belt replacement procedure. Such a result is highly undesirable. Therefore, a need exists for a camshaft alignment tool and method for maintaining the timing positioning of adjacent cog wheels on internal combustion engines employing cog wheel equipped double overhead camshafts during replacement of the timing belt.

SUMMARY OF THE INVENTION

It is therefore an object of the present invention to provide a camshaft alignment tool for maintaining the timing positioning of adjacent cog wheels on internal combustion engines employing cog wheel equipped double overhead camshafts driven by a cooperatively toothed timing belt during replacement of the belt.

It is a further object of the invention to achieve the above object by employing a method for replacing a timing belt on an internal combustion engine employing cog wheels of the type described above by directly and simultaneously fixing the cog wheels to one another while the belt is replaced with a single fixation tool.

These objects, and other objects and advantages of the invention which will become apparent from the description which follows, are achieved by providing a camshaft alignment tool having a main body defining a reference plane. At least three cog engaging members project transversely from the reference plane and are spaced apart relative to one another so that at least two of the projections can positively engage two pairs of cogs in one of the cog wheels, and so that the remaining projection can engage a pair of cogs on the remaining cog wheels whereby relative positioning of the cog wheel is maintained against torque induced on the camshaft by the valve springs during replacement of the timing belt. The tool is applied to the cog wheels before the timing belt is removed, and is removed from the cog wheel after the timing belt has been replaced. A single technician can perform this operation without assistance.

In the preferred embodiment of the invention, four projections are used. The projections are arranged in two pairs with the first pair positioned for engagement of a first cog wheel, and a second pair positioned for engagement of a second cog wheel. The spacing and positioning of the projections are selected appropriately for the mechanical dimensions of different sized cog wheels and engines.

BRIEF DESCRIPTION OF THE DRAWINGS

FIG. 1 is an isometric, environmental view of a modern, double overhead camshaft engine employing two cog wheel driven camshafts and a cooperatively toothed timing belt.

FIG. 2 is a partial isometric view of a double overhead camshaft alignment tool technique presently employed in certain automobiles.

FIG. 3 is an isometric, full scale view of an alignment tool of the present invention.

FIG. 5 is a front elevational view of the tool shown in FIG. 3.

FIG. 6 is a left side elevational view of the tool of FIG. 3.

FIG. 7 is a rear elevational view of the tool of FIG. 3.

FIG. 8 is a right side elevational view of the tool shown in FIG. 3.

FIG. 9 is a top plan view of the tool shown in FIG. 3 as well as a mirror image of a bottom plan view of the tool of FIG. 3.

DETAILED DESCRIPTION OF THE PREFERRED EMBODIMENTS

Figure 10:
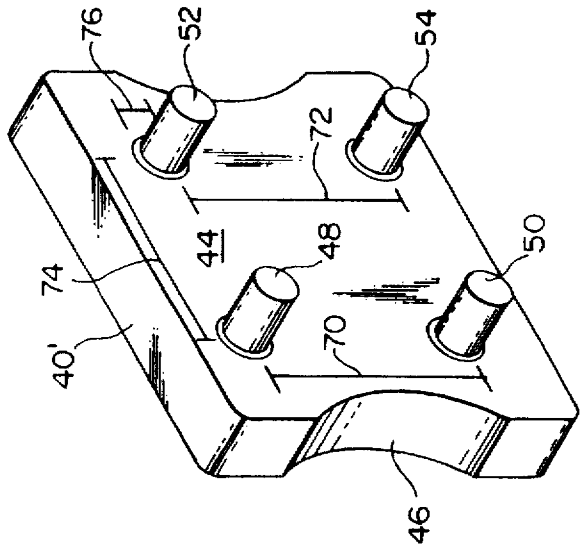
FIG. 10 is an isometric, full scale view of an alternate embodiment of the invention.

A camshaft alignment tool, in accordance with the principles of the invention is generally indicated at reference numeral 40 in FIGS. 3–9. The tool is adapted for use on an automobile engine 10 of the type employing double overhead camshafts 24 journaled for rotation with cog wheels 12, 14 which are themselves driven by a toothed timing belt 16 in a manner well known by those or ordinary skill in the automotive repair art.

The tool 40 has a main body 44 of generally rectangular shape having a height of approximately 3 inches, a width of approximately 1 7/16 inches, and a depth of approximately 1/2 inch. The body is preferably made of a relatively rigid yet inexpensive material such as aluminum. The body may be provided with sculpted out portions 46 which are primarily ornamental in nature, although such portions may provide clearance for bolts 47 used to secure the cog wheels 12, 14 on the camshaft 24. Moreover, portions 46 may also serve as an indication of source to the relevant consuming public.

Figure 4:
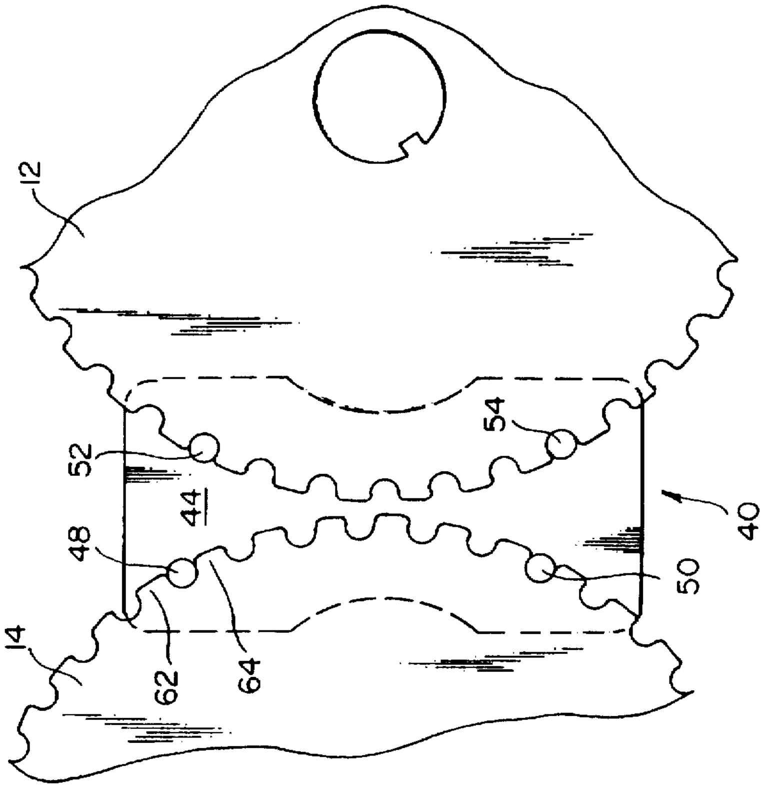
FIG. 4 is a schematic representation illustrating the tool shown in FIGS. 3–10 positioned on adjacent camshaft cog wheels of an internal combustion engine.

The main body 44 is preferably provided with four transverse protrusions 48, 50, 52, and 54 in the form of cylindrical steel pins having a length of approximately 5/16 inch and a diameter of approximately 3/16 inch. Although four projections are shown and preferred, at least three would suffice. As best shown in FIG. 4, these protrusions engage pairs of adjacent cogs or teeth (62, 64 for example) on each cog wheel such that the relative positions of the cog wheels 12, 14 are fixed while the tool remains installed and the timing belt 16 is replaced.

It is preferred that the relative positioning of the protrusions 48, 50, 52, and 54 be selected so as to closely and frictionally engage adjacent pairs of teeth on the cog wheels

12, 14 precisely so as to avoid slipping of the cog wheels or relative movement of the cog wheels. To this end, and as best seen in FIG. 5, projections 48 and 50 are arranged as a first pair having a first pair separation distance 70 of 54 mm, and wherein the projections 52, 54 form a second pair defining a second pair separation distance 72 also of 54 mm. A first reference line connecting projections 40–50 is substantially parallel to a second reference line connecting the projections 52, 54 wherein the reference lines are substantially parallel and define a reference line separation distance 74 of approximately 17 mm. It is also preferred for certain automobile brands that the first and second pairs be vertically offset as shown in FIG. 5 by a "misalignment distance" 76 of approximately 3 mm. All distances are measured on center of the projections 48, 50, 52 and 54 which as described above are cylindrical steel pins. The dimensions described above for the embodiment of FIGS. 3–9 are selected to closely engage the cogs or teeth, such as teeth 62, 64 of an Accura brand 1986–1989 Integra model automobile.

To use the tool 40, the camshaft 24 should be aligned at top dead center, cylinder number one thereby positioning the cog wheels 12, 14 in a respective correctly timed position. The tool 40 is then applied to the cog wheels so that protrusions 48, 50, 52 and 54 engage cogs on the cog wheels. The timing belt 16 can then be removed and/or replaced using both hands while the cog wheels remain stationary. The tool 40 can also be used to maintain the relative position of the cog wheels while the bolts 47 are loosened or tightened thereby avoiding stressing the belt 16 or disturbing the relative position of the camshaft 24 which are journaled by keys to the cog wheels. Such operation frequently occurs during camshaft seal replacement.

As shown in FIG. 10, an alternate embodiment 40' can be provided wherein like reference numerals refer to similar structure as for the preferred embodiment shown in FIGS. 4–9. In the alternate embodiment 40' shown in FIG. 10, the first and second pair separation distances 70, 72 are both approximately 28 mm, the reference line separation distance 74 is approximately 26 mm, and the misalignment distance 76 is approximately 3 mm. The dimensions described hereinabove for the alternate embodiment 40' are selected to positively engage cog wheels 12, 14 of a 1988–1989 Honda brand Prelude SI model automobile. The method of use of the alternate embodiment 40' shown in FIG. 10 is identical to that described for the embodiment shown in FIGS. 4–9. Upon further review and contemplation of this disclosure and the accompanying drawings, those of ordinary skill in the art will be able to devise other dimensional relationships between the projections 48, 50, 52 and 54 to engage the cog wheels on other double overhead camshaft engines.

In addition, those of ordinary skill in the art will devise other embodiments and variations of the invention which although not shown fall within the spirit of this disclosure. For example, the main body 44 need not be solid as shown but may be of a spider or truss configuration. Therefore, the invention is not to be limited by the above description, but is to be determined in scope by the claims which follow.

I claim:

1. A method for replacing a timing belt, comprising the steps of:

providing an internal combustion engine employing double overhead camshafts, with each camshaft having a cog wheel attached thereto, and a toothed timing belt engaging cogs of the cog wheels and driving said camshafts;

providing a fixation tool having a main body with at least three projecting pins extending therefrom;

engaging each of said projecting pins with a pair of cogs on each of said cog wheels, respectively, thereby directly and simultaneously fixing the cog wheels relative to one another; then removing said timing belt from said cog wheels while said projecting pins remain engaged with said pairs of cogs; then installing a toothed timing belt on said cog wheels such that teeth of the timing belt engage cogs of the cog wheels, while said projecting pins remain engaged with said pairs of cogs; and then disengaging said projecting pins from said pairs of cogs.

2. A method for replacing a timing belt, comprising the steps of, providing an internal combustion engine employing double overhead camshafts, with each camshaft having a cog wheel attached thereto, and a toothed timing belt engaging cogs of the cog wheels and driving said camshafts:

providing a fixation tool having at least three projections extending from a surface thereof;

positioning said fixation tool between said cog wheels so that said projections simultaneously and respectively positively engage two distinct pairs of adjacent cogs on one of said cog wheels, and at least one pair of adjacent cogs on the other of said cog wheels, thereby immobilizing the cog wheels and fixing the relative positions of the cog wheels; then removing said timing belt from said cog wheels while said projections remain engaged with said pairs of cogs; then installing a toothed timing belt on the cog wheels such that teeth of the timing belt engages cogs of the cog wheels, while said projections remain engaged with said pairs of cogs; and then removing said fixation tool from between said cog wheels, thereby disengaging said projections from pairs of cogs.

* * * * *

US005755029C1

(12) EX PARTE REEXAMINATION CERTIFICATE (5741st)

United States Patent

Learned

(10) Number: US 5,755,029 C1

(45) Certificate Issued: Apr. 17, 2007

(54) DOUBLE OVERHEAD CAMSHAFT ALIGNMENT METHOD

(76) Inventor: Kerry D. Learned, 4003 Seneca Dr., Mt. Vernon, WA (US) 98273

Reexamination Request:
No. 90/007,011, Apr. 22, 2004

Reexamination Certificate for:
Patent No.: 5,755,029
Issued: May 26, 1998
Appl. No.: 08/788,683
Filed: Jan. 24, 1997

Related U.S. Application Data

(62) Division of application No. 08/337,895, filed on Nov. 14, 1994, now abandoned.

(51) Int. Cl.
*B23P 6/00* (2006.01)

(52) U.S. Cl. ............................... 29/888.011; 29/402.03; 29/402.08; 29/426.1; 29/464; 29/559

(58) Field of Classification Search ....................... None
See application file for complete search history.

(56) References Cited

PUBLICATIONS

Chilton's Auto Repair Manual 1989–1993, Oct. 29, 1992 perpendicular. 11–27 through 11–29.*

* cited by examiner

*Primary Examiner*—Jimmy G. Foster

(57) ABSTRACT

A camshaft alignment tool and method uses a main body having at least three projections to engage cogs on cog wheel driven double overhead camshafts. The tool is used to maintain the cog wheels in a fixed relationship with respect to one another during replacement of a cooperatively toothed timing belt. Use of the tool enables a single technician to change the timing belt on a high performance internal combustion engine employing double overhead camshafts even if the cam surfaces are aggressive and the valve return springs employ large spring constants.

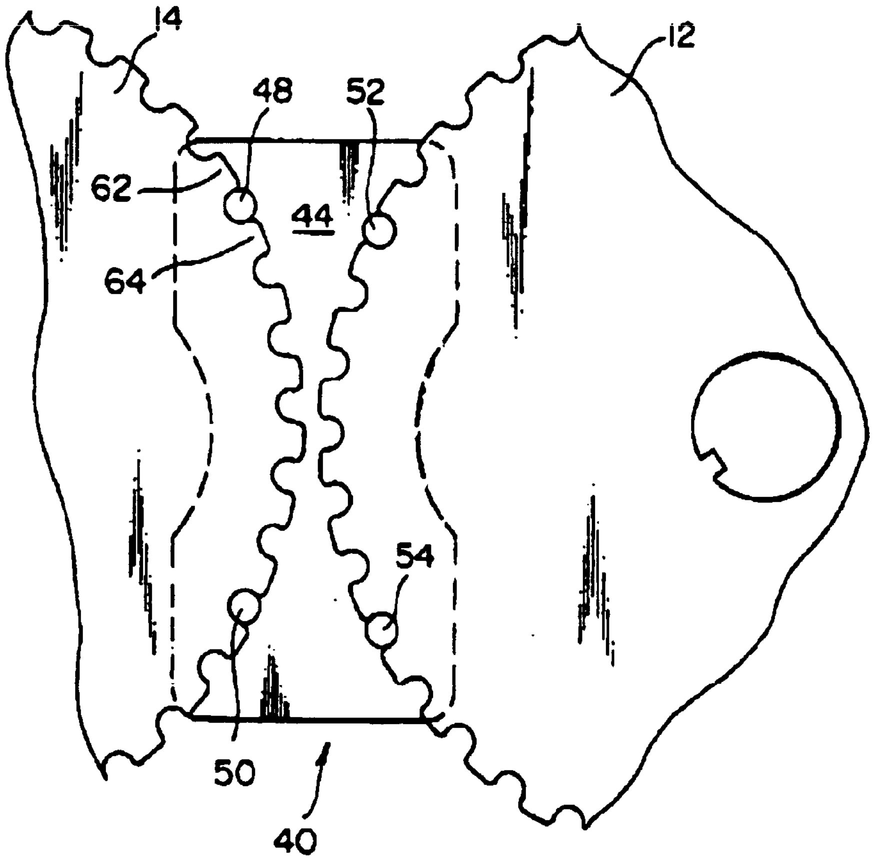

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 2 are cancelled.

* * * * *